United States Patent
Johanna et al.

(10) Patent No.: US 12,206,822 B2
(45) Date of Patent: Jan. 21, 2025

(54) SYSTEM AND METHOD FOR PROVIDING SUPPORT TO USER OF AUTONOMOUS VEHICLE (AV) BASED ON SENTIMENT ANALYSIS

(71) Applicant: GM Cruise Holdings LLC, San Francisco, CA (US)

(72) Inventors: Livia Johanna, San Francisco, CA (US); Hailun Zhou, San Francisco, CA (US); Theresa Foy, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 442 days.

(21) Appl. No.: 17/859,725

(22) Filed: Jul. 7, 2022

(65) Prior Publication Data

US 2024/0015248 A1    Jan. 11, 2024

(51) Int. Cl.
*H04M 3/523* (2006.01)
*B60W 40/08* (2012.01)
*B60W 50/00* (2006.01)
*B60W 60/00* (2020.01)
*G06V 20/58* (2022.01)

(52) U.S. Cl.
CPC .......... *H04M 3/5233* (2013.01); *B60W 40/08* (2013.01); *B60W 50/00* (2013.01); *B60W 60/0013* (2020.02); *B60W 60/00253* (2020.02); *G06V 20/58* (2022.01); *B60W 2050/0028* (2013.01); *B60W 2050/0083* (2013.01); *B60W 2420/403* (2013.01); *B60W 2556/10* (2020.02)

(58) Field of Classification Search
None
See application file for complete search history.

(56) References Cited

U.S. PATENT DOCUMENTS

| | | | |
|---|---|---|---|
| 2008/0267360 A1* | 10/2008 | Spector | H04M 3/42348 379/45 |
| 2010/0205262 A1* | 8/2010 | Peterson | H04M 3/51 709/204 |
| 2015/0307111 A1* | 10/2015 | Juzswik | B60W 50/08 701/2 |
| 2019/0286143 A1* | 9/2019 | Ross | G01C 21/3415 |
| 2021/0300417 A1* | 9/2021 | Sarkar | B60W 30/0956 |
| 2021/0370950 A1* | 12/2021 | Ghosh | B60W 50/085 |
| 2022/0128989 A1* | 4/2022 | Ghorbanian-Matloob | G05D 1/0038 |
| 2022/0410932 A1* | 12/2022 | Braunstein | B60W 10/30 |

* cited by examiner

*Primary Examiner* — Harry S Hong
(74) *Attorney, Agent, or Firm* — Wade C. Yamazaki

(57) ABSTRACT

Assistance can be provided to users of AVs based on user sentiments. A system may receive a request for assistance from a user of an AV (e.g., a passenger of the AV). The system may also receive sensor data that is captured by a sensor suite of the AV from detecting the user, the AV, or another object. The system determines a sentiment of the user based on the sensor data. The system may input the sensor data into a machine learning model and the model outputs information indicating the user's sentiment. The system can determine who, when, or how to service the user's request based on the user's sentiment. The system may assign the user's request to an agent who can provide the assistance. The system can further provide guidance (e.g., suggested content of a conversation with the user) to the agent based on the user's sentiment.

20 Claims, 7 Drawing Sheets

700

```
┌─────────────────────────────────────────────────┐
│ Receive, from a first device associated with a user │
│ receiving a service from a vehicle, a request for assistance │
│                       710                       │
└─────────────────────────────────────────────────┘
                         ↓
┌─────────────────────────────────────────────────┐
│ Receive sensor data from the vehicle, the sensor data │
│ captured by one or more sensors of the vehicle  │
│                       720                       │
└─────────────────────────────────────────────────┘
                         ↓
┌─────────────────────────────────────────────────┐
│ Determine a state of a user based on the sensor data │
│                       730                       │
└─────────────────────────────────────────────────┘
                         ↓
┌─────────────────────────────────────────────────┐
│ Generate, based on the state of the user, an instruction │
│ for an interaction between the user and an agent to │
│ provide the assistance to the user              │
│                       740                       │
└─────────────────────────────────────────────────┘
                         ↓
┌─────────────────────────────────────────────────┐
│ Provide the instruction to a second device associated with │
│ the agent, the agent to make the interaction with the user │
│ in accordance with the instruction              │
│                       740                       │
└─────────────────────────────────────────────────┘
```

FIG. 7

SYSTEM AND METHOD FOR PROVIDING SUPPORT TO USER OF AUTONOMOUS VEHICLE (AV) BASED ON SENTIMENT ANALYSIS

TECHNICAL FIELD OF THE DISCLOSURE

The present disclosure relates generally to AVs and, more specifically, to providing support to users of AVs based on sentiment analysis.

BACKGROUND

An AV is a vehicle that is capable of sensing and navigating its environment with little or no user input. An AV may sense its environment using sensing devices such as Radio Detection and Ranging (RADAR), Light Detection and Ranging (LIDAR), image sensors, cameras, and the like. An AV system may also use information from a global positioning system (GPS), navigation systems, vehicle-to-vehicle communication, vehicle-to-infrastructure technology, and/or drive-by-wire systems to navigate the vehicle. As used herein, the phrase "AV" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a flowchart showing a method of providing support to a user of an AV, according to some embodiments of the present disclosure.

DESCRIPTION OF EXAMPLE EMBODIMENTS OF THE DISCLOSURE

Overview

Figure 1:
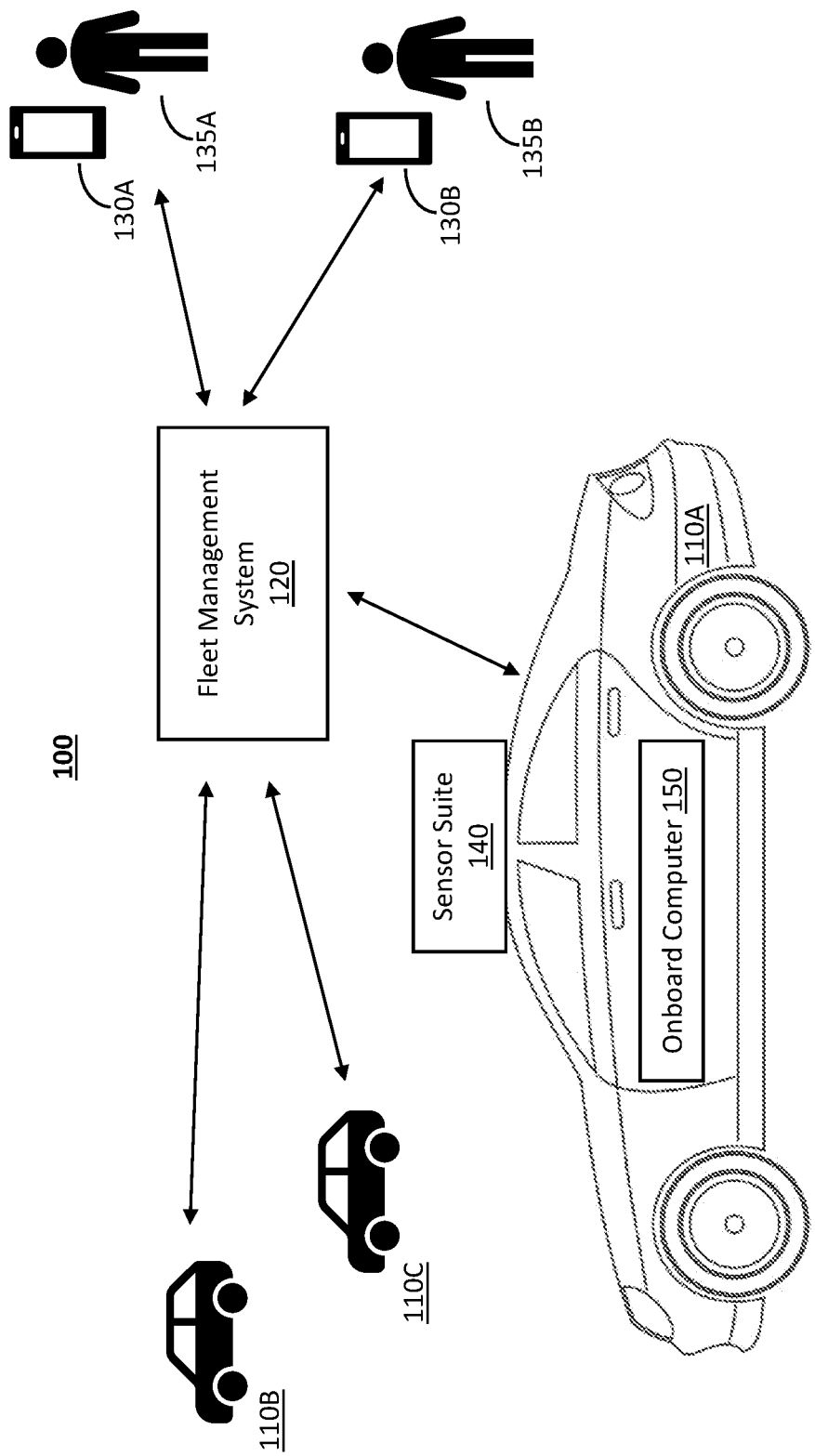
FIG. 1 illustrates a system including a fleet of AVs that can provide services to users.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs can provide driverless ride services. A person can request an AV to pick him/her up from a location and drop him/her off at another location. With the autonomous driving features of the AV, the person does not have to drive during the ride and can be considered as a passenger of the AV. The passenger may need assistance during the ride. For example, the AV may be involved in an accident (e.g., a car accident, AV pulled over by police, etc.). The passenger may need assistance to handle the accident. The passenger may need help to communicate with other people involved in the accident, to seek medical care, to get a ride by another AV, and so on. As there is no driver, assistance is usually provided to AV passengers through remote customer support service. The passenger can talk to a customer support agent, who can provide the assistance, through a phone call, for example. However, such remote communication may not be as efficient as on-site communication. Thus, improved technology for assisting AV passengers is needed.

Embodiments of the present disclosure provides a user support platform for providing support to users of AVs based on user states, such as user sentiments. The user support platform may be facilitated by a system that manages a fleet of AVs that can provide services. A user of an AV (also referred to as "AV user") may be a person that receives a service provide by the AV. For example, the service is a ride service, and the user is a passenger of the AV. As another example, the service is a delivery service, and the user is a person who load one or more items into the AV or pick up one or more items from the AV. The user may run into an issue during the service and may need assistance to deal with the issue. For example, the user may fail to use a function of the AV during the service, such as an entertainment function (e.g., media player, radio, car play, etc.), temperature controlling function (e.g., air conditioning, heater, etc.), seat adjustment function, and so on. As another example, the user may notice a malfunction of a component of the AV. As yet another example, the AV may be involved in an accident (e.g., collision with another vehicle, pulled over by police, etc.) during the service and the user needs help with the accident.

The user support platform enables the user to submit a support request to request assistance for handling the issue. The support request may be sent to the user support platform from an onboard computer of the AV or a client device of the user. The user support platform, after receiving the support request, determines one or more sentiments of the user ("user sentiments"). For instance, the user support platform may request sensor data captured by a sensor suite of the AV, such as sensor data that may suggest or imply user sentiments. The sensor suite may generate the sensor data by detecting the user, the AV, or an object in the environment surrounding the user or AV. The user support platform may use a trained model to process the sensor data, and the user support platform can determine user sentiments based on an output of the trained model. The user support platform may determine the user's sentiment further based on other information, such as historical data of the user, historical data of the AV, and so on. For instance, the user support platform may predict one or more user sentiments based on historical data, e.g., data associated with past rides of the user. The user support platform may determine a series of user sentiments and can further determine how user sentiment changes over time.

Further, the user support platform can determine who, when, or how to service the support request based on the user's sentiment. The user support platform may assign, based on the user's sentiment, the support request to an agent who can have a conversation with the user to help the user with the issue. The user support platform may also determine a waiting time for the support request based on the user's sentiment. The user support platform can also provide an instruction (or guidance) for the agent's conversation with the user based on the user's sentiment. The instruction may specify content of the conversation that can help improve the user's sentiment or help the agent to provide effective assistance. The user support platform may further instruct the onboard computer to change a condition of the AV to facilitate the conversation. For instance, the user support platform may instruct the onboard computer to reduce the temperature setting of the AV to make the passenger calmer. The user support platform may instruct the onboard computer to change a navigation route of the AV based on the user's sentiment.

By using sensor data from the AV, the user support platform can detect a real-time sentiment of the user, i.e., a sentiment of the user at the time the user makes the support request or shortly after the user makes the support request. The user support platform can service the support request based on the user's sentiment. Different user sentiments can lead to different actions of the user support platform, such as assigning different agents providing support, instructing the agent to perform different actions to provide support, instructing the AV to modify operational behaviors, and so on. Compared with conventional customer service, the user support platform can provide more efficient assistance to users.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example System Facilitating User Support Platform

FIG. 1 illustrates a system 100 including a fleet of AVs that can provide services to users, according to some embodiments of the present disclosure. The system 100 includes AVs 110A-110C (collectively referred to as "AVs 110" or "AV 110"), a fleet management system 120, and client devices 130A and 130B (collectively referred to as "client devices 130" or "client device 130"). The client devices 130A and 130B are associated with users 135A and 135B, respectively. The AV 110A includes a sensor suite 140 and an onboard computer 150. Even though not shown in FIG. 1, the AV 110B or 110C can also include a sensor suite 140 and an onboard computer 150. In other embodiments, the system 100 may include more, fewer, or different components. For example, the fleet of AVs 110 may include a different number of AVs 110 or a different number of client devices 130.

The fleet management system 120 manages the fleet of AVs 110. The fleet management system 120 may manage one or more services that the fleet of AVs 110 provides to the users 135. An example service is a ride service, e.g., an AV 110 provides a ride to a user 135 from a first location to a second location. Another example service is a delivery service, e.g., an AV 110 delivers one or more items from or to the user 135. The fleet management system 120 can select one or more AVs 110 (e.g., AV 110A) to perform a particular service, and instructs the selected AV to drive to one or more particular locations associated with the service (e.g., a first address to pick up user 135A, and a second address to pick up user 135B). The fleet management system 120 also manages fleet maintenance tasks, such as fueling, inspecting, and servicing of the AVs. As shown in FIG. 1, the AVs 110 communicate with the fleet management system 120. The AVs 110 and fleet management system 120 may connect over a network, such as the Internet.

In some embodiments, the fleet management system 120 receives service requests for the AVs 110 from the client devices 130. In an example, the user 135A accesses an app executing on the client device 130A and requests a ride from a pickup location (e.g., the current location of the client device 130A) to a destination location. The client device 130A transmits the ride request to the fleet management system 120. The fleet management system 120 selects an AV 110 from the fleet of AVs 110 and dispatches the selected AV 110A to the pickup location to carry out the ride request. In some embodiments, the ride request further includes a number of passengers in the group. In some embodiments, the ride request indicates whether a user 135 is interested in a shared ride with another user traveling in the same direction or along a same portion of a route. The ride request, or settings previously entered by the user 135, may further indicate whether the user 135 is interested in interaction with another passenger.

The fleet management system 120 also facilitates a user support platform that provides support to the users 135. The user support platform enables the users 135 to request assistance with issues associated with the services provided by the AVs 110. An example issue may be a difficulty of the user 135 using a function of the AV 110 (such as entertainment function, navigation function, communication function, etc.), a problem with the AV 110 (such as a malfunction of the AV 110 or a component of the AV 110, etc.), an issue involving another person or vehicle (such as a car accident involving the AV 110 and another vehicle, the AV 110 being pulled over by police, etc.), an issue associated with the environment surrounding the AV 110, and so on. The user 135 may not be able to deal with the issue by him/herself. The user support platform can assist the user 135 to deal with situations like this. For instance, the user support platform enables the user 135 to submit a support request to the fleet management system 120. The user support platform can help the user 135 based on the support request.

The user support platform may provide the assistance further based on a state of the user 135. The state of the user 135 may be, for example, a sentiment, a physical condition, or other types of states of the user 135. The state of the user 135 may be a real-time state, e.g., a state of the user 135 at a time that the support request was made or at a time shortly (e.g., immediately) after the support request was made. The state of the user 135 may be determined based on information of the user 135, information of the AV 110, information of an environment surrounding the user 135 or AV 110 (e.g., one or more objects in the environment), or some combination thereof. The user support platform may assign the support request to an agent based on the state of the user 135. The agent services the support request. For instance, the agent can interact with the user 135 and help the user 135 with the issue that triggers the support request. The agent may interact with the user 135 in accordance with guidance provided by the user support platform. The user support platform may generate the guidance based on the state of the user 135. As the support request is assigned and serviced based on the state of the user 135, the support provided by the user support platform to the user 135 is customized to the state of the user 135 and can be more effective than regular remote customer service. More details regarding the user support platform are provided below in conjunction with FIGS. 2 and 3.

A client device 130 is a device capable of communicating with the fleet management system 120, e.g., via one or more networks. The client device 130 can transmit data to the fleet management system 120 and receive data from the fleet management system 120. The client device 130 can also receive user input and provide outputs. In some embodiments, outputs of the client devices 130 are in human-perceptible forms, such as text, graphics, audio, video, and so on. The client device 130 may include various output components, such as monitors, speakers, headphones, projectors, and so on. The client device 130 may be a desktop or a laptop computer, a smartphone, a mobile telephone, a personal digital assistant (PDA), or another suitable device.

In some embodiments, a client device 130 executes an application allowing a user 135 of the client device 130 to interact with the fleet management system 120. For example, a client device 130 executes a browser application to enable interaction between the client device 130 and the fleet management system 120 via a network. In another embodiment, a client device 130 interacts with the fleet management system 120 through an application programming interface (API) running on a native operating system of the client device 130, such as IOS® or ANDROID™. The application may be provided and maintained by the fleet management system 120. The fleet management system 120 may also update the application and provide the update to the client device 130.

In some embodiments, a user 135 may submit service requests to the fleet management system 120 through a client device 130. A client device 130 may provide its user 135 a user interface (UI), through which the user 135 can make service requests, such as ride request (e.g., a request to pick up a person from a pickup location and drop off the person at a destination location), delivery request (e.g., a request to delivery one or more items from a location to another location), and so on. The UI may allow users 135 to provide locations (e.g., pickup location, destination location, etc.) or other information that would be needed by AVs 110 to provide services requested by the users 135. The client device 130 may also provide the user 135 an UI through which the user 135 can interact with the user support platform. For instance, the UI enables the user to submit a request for assistance to the user support platform through a network or a telephone service (e.g., a customer service hotline). The UI can further facilitate a communication between the user 135 and an agent of the user support platform who can provide the requested assistance. The UI may further enable the user to rate the agent or the user support platform.

The AV 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 140 may include a computer vision ("CV") system, localization sensors, and driving sensors. For example, the sensor suite 140 may include interior and exterior cameras, RADAR sensors, sonar sensors, LIDAR sensors, thermal sensors, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. Certain sensors of the sensor suite 140 are described further in relation to FIG. 4.

The onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. The onboard computer 150 may be preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems.

In some embodiments, the onboard computer 150 is in communication with the fleet management system 120, e.g., through a network. The onboard computer 150 may receive instructions from the fleet management system 120 and control behavior of the AV 110 based on the instructions. For example, the onboard computer 150 may receive from the fleet management system 120 an instruction for providing a ride to a user 135. The instruction may include information of the ride (e.g., pickup location, drop-off location, intermediate stops, etc.), information of the user 135 (e.g., identifying information of the user 135, contact information of the user 135, etc.). The onboard computer 150 may determine a navigation route of the AV 110 based on the instruction. As another example, the onboard computer 150 may receive from the fleet management system 120 a request for sensor data to be used by the user support platform. The onboard computer 150 may control one or more sensors of the sensor suite 140 to detect the user 135, the AV 110, or an environment surrounding the AV 110 based on the instruction and further provide the sensor data from the sensor suite 140 to the fleet management system 120. The onboard computer 150 may transmit other information requested by the fleet management system 120, such as perception of the AV 110 that is determined by a perception module of the onboard computer 150, historical data of the AV 110, and so on. Certain aspects of the onboard computer 150 are described further in relation to FIG. 5.

Example Fleet Management System

Figure 2:
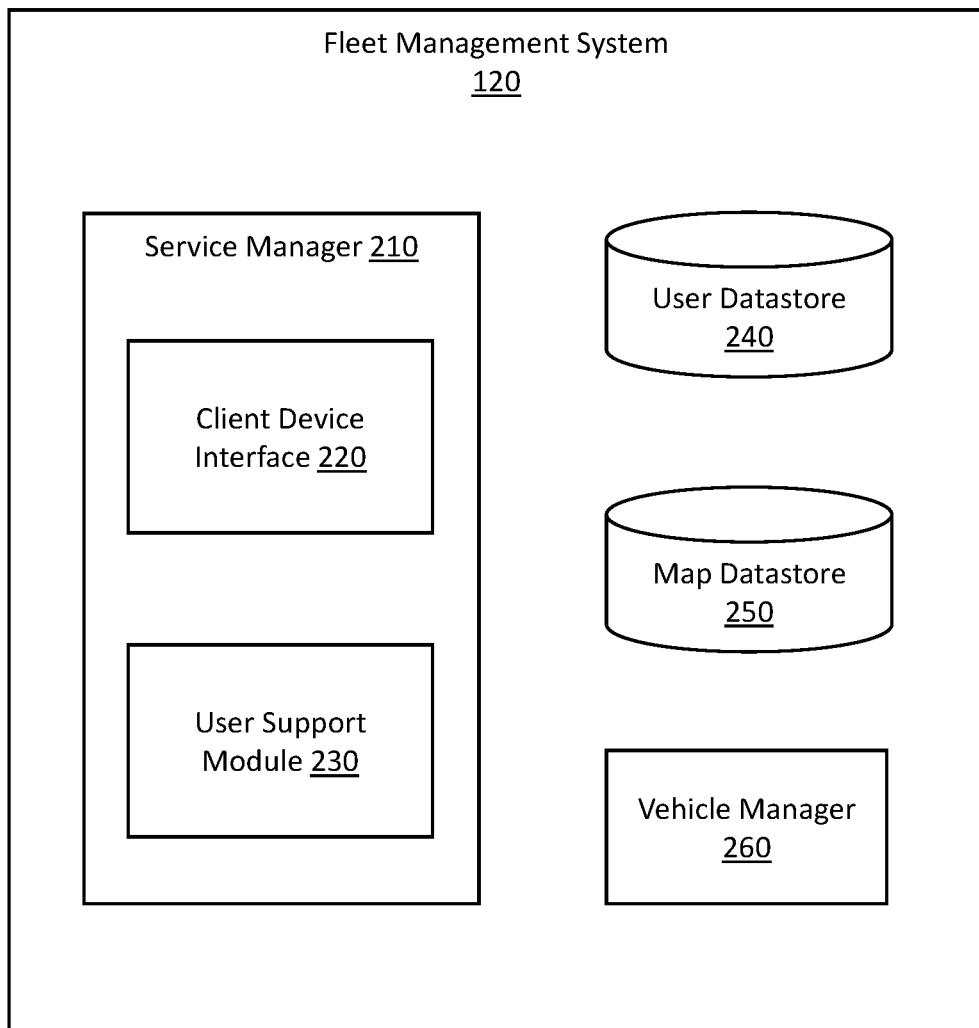
FIG. 2 is a block diagram showing a fleet management system, according to some embodiments of the present disclosure.

FIG. 2 is a block diagram showing the fleet management system, according to some embodiments of the present disclosure. The fleet management system 120 includes a service manager 210, a user datastore 240, a map datastore 250, and a vehicle manager 260. In alternative configurations, different and/or additional components may be included in the fleet management system 120. Further, functionality attributed to one component of the fleet management system 120 may be accomplished by a different component included in the fleet management system 120 or a different system than those illustrated, such as the onboard computer 150.

The service manager 210 manages services that the fleet of AVs 110 can provide. The service manager 210 includes a client device interface 220 and a user support module 230. The client device interface 220 provides interfaces to client devices, such as headsets, smartphones, tablets, computers, and so on. For example, the client device interface 220 may provide one or more apps or browser-based interfaces that can be accessed by users, such as the users 135, using client devices, such as the client devices 130. The client device interface 220 enables the users to submit requests to a ride service provided or enabled by the fleet management system 120. In particular, the client device interface 220 enables a user to submit a ride request that includes an origin (or pickup) location and a destination (or drop-off) location. The ride request may include additional information, such as a number of passengers traveling with the user, and whether or not the user is interested in shared ride with one or more other passengers not known to the user.

The client device interface 220 can also enable users to select ride settings. The client device interface 220 can provide one or more options for the user to engage in a virtual environment, such as whether to interact with another person, whether to involve in an entertainment activity, and so on. The client device interface 220 may enable a user to opt-in to some, all, or none of the virtual activities offered by the ride service provider. The client device interface 220 may further enable the user to opt-in to certain monitoring features, e.g., to opt-in to have the interior sensors 440 obtain sensor data of the user. The client device interface 220 may explain how this data is used by the service manager 210 (e.g., for providing support to the user, etc.) and may enable users to selectively opt-in to certain monitoring features, or to opt-out of all of the monitoring features. In some embodiments, the user support platform may provide a modified version of a virtual activity if a user has opted out of some or all of the monitoring features.

The user support module 230 facilitates a user support platform, e.g., the user support platform described above. The user support module 230 may receive support requests from passengers of AVs through the client device interface 220 or the onboard computer 150. The user support module 230 manages the support requests. In some embodiments, the user support module 230 maintains a queue of pending support requests, in which the pending support requests may be arranged in an order. A pending support request is a support request that have not been completed. A support request may be considered completed after the support requested by the passenger has been provided or the issue that triggered the support request has been resolved.

The user support module 230 may assign the pending support requests to agents based on the order in the queue. The agent can interact with the passenger and provide support to the passenger. An agent may be associated with a device in communication with the user support module 230. The device may be a desktop or a laptop computer, a smartphone, a mobile telephone, a PDA, or another suitable device. The user support module 230 may send information related to support requests assigned to the agent to the agent's device. The information may include the support requests and guidance on how to provide the requested support.

In some embodiments, the user support module 230 determines a state (e.g., a sentiment) of a passenger who submitted a support request and processes the support request based on the passenger's state. The user support module 230 may determine the passenger's state based on data of the passenger, data of the AV, data of one or more objects in an environment surrounding the passenger or AV, or some combination thereof. The data may include sensor data generated by the sensor suite 140 from detecting the passenger, AV, one or more objects in the environment, or some combination thereof. For instance, the user support module 230 may interface with AVs 110 (e.g., with onboard computers of the AVs 110) and receive sensor data from the AVs 110. The sensor data may be camera images, captured sound, measured temperature, other outputs from the sensor suite 140, or some combination thereof. The data may also include data retrieved by the user support module 230 from the user datastore 240 or map datastore 250. In an embodiment, the user support module 230 may provide the data to a trained model and the train model analyzes the sentiment of the passenger. The trained model may classify the passenger's sentiment. Example categories include negative (e.g., anxious, angry, etc.), neural (e.g., calm), positive (e.g., confident, happy, etc.), and so on. The trained model may also estimate a degree of the passenger's sentiment, such as an anxiety level or anger level.

The user support module 230 may assign the support request to an agent based on the passenger's state. For instance, based on a determination that the passenger is anxious, the user support module 230 may assign the support request to a currently available agent or the next available agent so that the waiting time of the passenger can be minimized. The agent, who receives the support request, can help the passenger to deal with the issue. The agent may communicate with the passenger, e.g., through an audio or video call. The user support module 230 can also generate guidance for the agent's interaction with the passenger based on the passenger's state. For instance, the user support module 230 may provide guidance on the language or tone to be used by the agent during the communication with the passenger. Certain aspects of the user support module 230 are described below in conjunction with FIG. 3.

The user datastore 240 stores ride information associated with users of the ride service, e.g., the users 135. In some embodiments, the user datastore 240 stores user sentiments associated with rides taken by the user 135. The user sentiments may be determined by the user support module 230. The user datastore 240 may store an origin location and a destination location for a user's current ride. The user datastore 240 may also store historical ride data for a user, including origin and destination locations, dates, and times of previous rides taken by a user. The historical data of the user may also include information associated with historical support requests made by the user during the previous rides, such as sensor data associated with the historical support requests, communications of the user with agents that serviced the historical support requests, states of the user during the communications, information of AVs 110 associated with the historical support requests, and so on. In some cases, the user datastore 240 may further store future ride data, e.g., origin and destination locations, dates, and times of planned rides that a user has scheduled with the ride service provided by the AVs 110 and fleet management system 120. Some or all of the data of a user in the user datastore 240 may be received through the client device interface 220, an onboard computer (e.g., the onboard computer 150), a sensor suite of AVs 110 (e.g., the sensor suite 140), a third-party system associated with the user and the fleet management system 120, or other systems or devices.

In some embodiments, the user datastore 240 also stores data indicating user interests associated with rides in AVs. The fleet management system 120 may include one or more learning modules (not shown in FIG. 2) to learn user interests based on user data. For example, a learning module may compare locations in the user datastore 240 with map datastore 250 to identify places the user has visited or plans to visit. For example, the learning module may compare an origin or destination address for a user in the user datastore 240 to an entry in the map datastore 250 that describes a building at that address. The map datastore 250 may indicate a building type, e.g., to determine that the user was picked up or dropped off at an event center, a restaurant, or a movie theater. In some embodiments, the learning module may further compare a date of the ride to event data from another data source (e.g., a third-party event data source, or a third-party movie data source) to identify a more particular interest, e.g., to identify a performer who performed at the event center on the day that the user was picked up from an event center, or to identify a movie that started shortly after the user was dropped off at a movie theater. This interest (e.g., the performer or movie) may be added to the user datastore 240.

The map datastore 250 stores a detailed map of environments through which the AVs 110 may travel. The map datastore 250 includes data describing roadways, such as e.g., locations of roadways, connections between roadways, roadway names, speed limits, traffic flow regulations, toll information, etc. The map datastore 250 may further include data describing buildings (e.g., locations of buildings, building geometry, building types), and data describing other objects (e.g., location, geometry, object type) that may be in the environments of AV 110. The map datastore 250 may also include data describing other features, such as bike lanes, sidewalks, crosswalks, traffic lights, parking lots, signs, billboards, etc.

Some of the map datastore 250 may be gathered by the fleet of AVs 110. For example, images obtained by the exterior sensors 410 of the AVs 110 may be used to learn information about the AVs' environments. As one example, AVs may capture images in a residential neighborhood during a Christmas season, and the images may be processed to identify which homes have Christmas decorations. The images may be processed to identify particular features in the environment. For the Christmas decoration example, such features may include light color, light design (e.g., lights on trees, roof icicles, etc.), types of blow-up figures, etc. The fleet management system 120 and/or AVs 110 may have one or more image processing modules to identify features in the captured images or other sensor data. This feature data may be stored in the map datastore 250. In some embodiments, certain feature data (e.g., seasonal data, such as Christmas decorations, or other features that are expected to be temporary) may expire after a certain period of time. In some embodiments, data captured by a second AV 110 may indicate that a previously-observed feature is no longer present (e.g., a blow-up Santa has been removed) and in response, the fleet management system 120 may remove this feature from the map datastore 250.

The vehicle manager 260 manages and communicates with the fleet of AVs 110. The vehicle manager 260 assigns the AVs 110 to various tasks and directs the movements of the AVs 110 in the fleet. The vehicle manager 260 includes a vehicle manager 260 and an AV 110 interface 290. In some embodiments, the vehicle manager 260 includes additional functionalities not specifically shown in FIG. 2. For example, the vehicle manager 260 instructs AVs 110 to drive to other locations while not servicing a user, e.g., to improve geographic distribution of the fleet, to anticipate demand at particular locations, etc. The vehicle manager 260 may also instruct AVs 110 to return to an AV 110 facility for fueling, inspection, maintenance, or storage.

In some embodiments, the vehicle manager 260 selects AVs from the fleet to perform various tasks and instructs the AVs to perform the tasks. For example, the vehicle manager 260 receives a ride request from the client device interface 220. The vehicle manager 260 selects an AV 110 to service the ride request based on the information provided in the ride request, e.g., the origin and destination locations. If multiple AVs 110 in the AV 110 fleet are suitable for servicing the ride request, the vehicle manager 260 may match users for shared rides based on an expected compatibility. For example, the vehicle manager 260 may match users with similar user interests, e.g., as indicated by the user datastore 240. In some embodiments, the vehicle manager 260 may match users for shared rides based on previously-observed compatibility or incompatibility when the users had previously shared a ride.

The vehicle manager 260 or another system may maintain or access data describing each of the AVs in the fleet of AVs 110, including current location, service status (e.g., whether the AV 110 is available or performing a service; when the AV 110 is expected to become available; whether the AV 110 is schedule for future service), fuel or battery level, etc. The vehicle manager 260 may select AVs for service in a manner that optimizes one or more additional factors, including fleet distribution, fleet utilization, and energy consumption. The vehicle manager 260 may interface with one or more predictive algorithms that project future service requests and/or vehicle use, and select vehicles for services based on the projections.

The vehicle manager 260 transmits instructions dispatching the selected AVs. In particular, the vehicle manager 260 instructs a selected AV 110 to drive autonomously to a pickup location in the ride request and to pick up the user and, in some cases, to drive autonomously to a second pickup location in a second ride request to pick up a second user. The first and second user may jointly participate in a virtual activity, e.g., a cooperative game or a conversation. The vehicle manager 260 may dispatch the same AV 110 to pick up additional users at their pickup locations, e.g., the AV 110 may simultaneously provide rides to three, four, or more users. The vehicle manager 260 further instructs the AV 110 to drive autonomously to the respective destination locations of the users.

Figure 3:
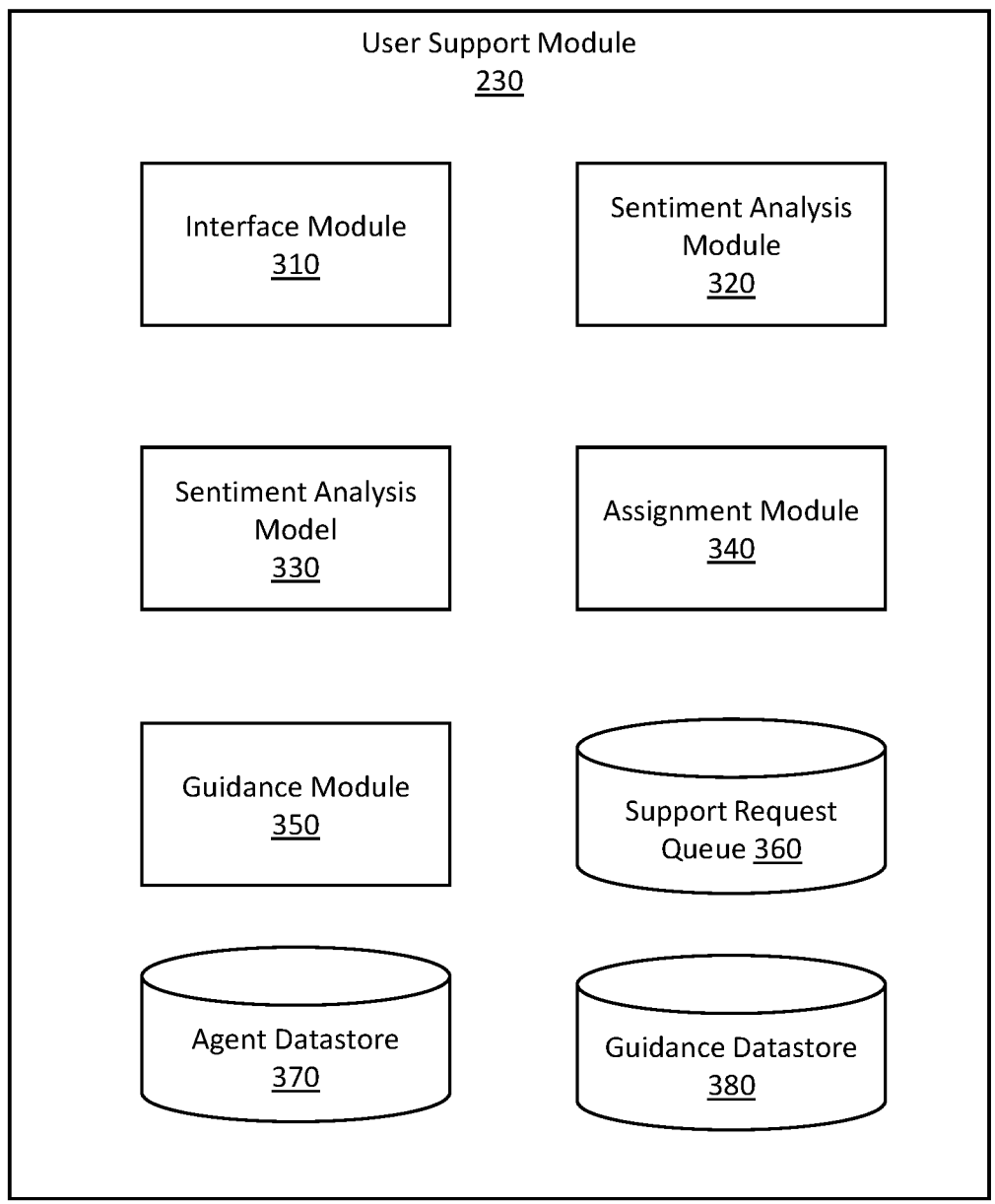
FIG. 3 is a block diagram showing a user support module, according to some embodiments of the present disclosure.

FIG. 3 is a block diagram showing the user support module 230, according to some embodiments of the present disclosure. As described above, the user support module 230 can manage support requests made by AV users based on states of the AV users. The user support module 230 includes an interface module 310, a sentiment analysis module 320, a sentiment analysis model 330, an assignment module 340, a guidance module 350, a support request queue 360, an agent datastore 370, and a guidance store 380. In alternative configurations, different and/or additional components may be included in the user support module 230. Further, functionality attributed to one component of the user support module 230 may be accomplished by a different component included in the user support module 230, a different component included in the fleet management system 120, or a different system than those illustrated. The following description of certain aspects of the user support module 230 is for embodiments where an AV user is an AV passenger. However, these aspects of the user support module 230 also apply to other embodiments, such as embodiments where an AV user is a person that receives a delivery service from an AV.

The interface module 310 facilitates communications of the user support module with other components of the fleet management system 120 or other systems or devices. In some embodiments, the interface module 310 receives support requests made by AV users, e.g., from the client device interface 220, onboard computers of AVs, or other devices that AV users may use to interact with the user support module 230. The interface module 310 may also communicate with AVs, e.g., onboard computers of AVs. The interface module 310 may send requests for sensor data to AVs and receive requested sensor data from the AVs. The interface module 310 may provide received data to other components of the user support module 230. For example, the interface module 310 may provide received support request to the assignment module 340. As another example interface module 310 may provide received sensor data to the sentiment analysis module.

In some embodiments, the interface module 310 also facilitates a communication between an AV user seeking support and an agent who can provide the support. For instance, the interface module 310 may receive information of the agent from the support manager and connect the agent to the user based on the information. The information of the agent may be information identifying the agent (e.g., ID number, name, etc.), information for contacting the agent (e.g., phone number, computer ID, etc.), and so on. In an example where the interface module 310 receives a call (e.g., audio call, video call, etc.) from the user, the interface module 310 can transfer the call to a device associated with the agent so that the agent can assist the user through the call.

The sentiment analysis module 320 determines sentiments of users that made support requests received by the interface module 310. The sentiment analysis module 320 may use the sentiment analysis model 330 to determine a user's sentiment. In some embodiments, the sentiment analysis module 320 generates a dataset for the support request and input the dataset into the sentiment analysis model 330. The sentiment analysis model 330 can process the dataset and outputs information indicating a sentiment of the user. The sentiment analysis module 320 may generate the dataset by using data showing or implying user's sentiment, such as data associated with the user, data associated with the AV, data associated with an environment where the AV 110 operates to provide the ride to the user, or some combination thereof.

Data associated with the user may include sensor data from one more sensors that detect the user. The one or more sensors may be sensors in the sensor suite of the AV. The sensor data may include one or more images of the user (e.g., images showing facial expression, pose, or other conditions of the user), voice of the user (e.g., voice volume, voice frequency, etc.), words of the user, a temperature of the user, a heart rate of the user, other types of sensor data, or some combination thereof. The sensor data may be real-time sensor data, meaning data captured by the one or more sensors at the time the support request is made or shortly after the support request is made, e.g., at a time the AV 110 receives the request for the sensor data from the interface module 310. Data associated with the user may also include historical data of the user, such as data of historical AV 110 rides of the user, data of historical support requests made by the user, historical sentiments of the user, and so on. Data associated with the user may also include other information provided by the user, such as biographic, demographic, and other types of descriptive information. The sentiment analysis module 320 may retrieve some of the data associated with the user from the user datastore 240.

Data associated with the AV 110 may include data indicating one or more conditions of the AV, such as a condition that can influence the user's sentiment. Example conditions include malfunction, damage caused by car accident, and so on. Data associated with the AV 110 may include real-time data and historical data. Data associated with the environment may include data associated with one or more objects in the environment, such as another person, another vehicle, or other types of objects. The one or more objects may have an influence on the user's sentiment.

The sentiment analysis model 330 may output one or more classifications of the user's sentiment. Example classifications may include anxious, angry, calm, positive, negative, neural, and so on. The sentiment analysis model 330 may output a score (e.g., a numerical value) that indicates a likelihood of the user having a sentiment. The sentiment analysis module 320 may compare the score from the sentiment analysis model 330 with a threshold score and determine that the user has the sentiment in embodiments where the score is above the threshold score. In some embodiments, the sentiment analysis model 330 may output multiple scores, each of which correspond to a different type of sentiment, such as an anxiety score corresponding to anxious, an anger score corresponding to angry, and so on. The sentiment analysis module 320 may select the type of sentiment having the highest score as the sentiment of the user.

The sentiment analysis module 320 may also determine a degree of the user's sentiment, e.g., based on a difference between the corresponding score from the sentiment analysis model 330 and the threshold score. In an example, the sentiment analysis model 330 determines that the user's anxiety is high based on a determination that the difference between the anxiety score and the threshold score falls in a first predetermined range, determines that the user's anxiety is medium based on a determination that the difference between the anxiety score and the threshold score falls in a second predetermined range, or determines that the user's anxiety is low based on a determination that the difference between the anxiety score and the threshold score falls in a third predetermined range.

The sentiment analysis module 320 may also determine a change in the user's sentiment. For instance, the sentiment analysis module 320 determines a first sentiment of the user at a first time and a second sentiment of the user at a second time that is later than the first time. The sentiment analysis module 320 can compare the second sentiment with the first sentiment to detect a change in the user's sentiment. In some embodiments, the sentiment analysis module 320 determines a fast change in the user's sentiment. The duration of time between the first time and the second time can be within a threshold duration, such as seconds or minutes.

In some embodiments, the sentiment analysis module 320 receives the sentiment analysis model 330, e.g., from another component of the fleet management system 120 or another system that trains the sentiment analysis model 330. In other embodiments, the sentiment analysis module 320 trains the sentiment analysis model 330 itself. The sentiment analysis module 320 may apply machine learning techniques to generate the sentiment analysis model 330 that when applied to data showing or implying human sentiments outputs indications of human sentiments. As part of the generation of the sentiment analysis model 330, the sentiment analysis module 320 forms a training set that includes training samples and ground-truth labels of the training samples. A training sample may be a dataset including data showing or implying a person's sentiment. A ground-truth label of the training sample may be a known or verified sentiment of the person. A training sample may be associated with multiple ground-truth labels indicating multiple sentiments. The sentiment analysis module 320 may input the training samples into the sentiment analysis model 330 and uses a cost function or loss function to adjust parameters of the sentiment analysis model 330 to minimize differences between labels generated by the sentiment analysis model 330 based on the training samples and the ground-truth labels of the sentiment analysis model 330. Different machine learning techniques—such as neural networks, linear support vector machine (linear SVM), boosting for other algorithms (e.g., AdaBoost), logistic regression, naïve Bayes, memory-based learning, random forests, bagged trees, decision trees, boosted trees, or boosted stumps—may be used in different embodiments.

In some embodiments, the sentiment analysis module 320 also verifies a performance (e.g., accuracy) of the sentiment analysis model 330. The sentiment analysis module 320 may form validation set that includes samples other than those in the training sets and ground-truth labels of the samples. The sentiment analysis module 320 may apply the trained sentiment analysis model 330 to the samples of the validation set to quantify the accuracy of the sentiment analysis model 330. In one embodiment, the sentiment analysis module 320 iteratively re-trains the sentiment analysis model 330 until the occurrence of a stopping condition, such as the accuracy measurement indication that the model is sufficiently accurate, or a number of training rounds having taken place.

The sentiment analysis module 320 may continuously train the sentiment analysis model 330. For instance, the sentiment analysis module 320 continuously generate new training samples and can use the new training samples to further train the sentiment analysis model 330. A new training sample may be a dataset formed by the sentiment analysis module 320 for determining a sentiment of a user requesting support. The sentiment analysis module 320 may generate a ground-truth label of the new training sample based on feedback from the user or from the agent who helped the user, such as feedback indicating that the determine sentiment is the true sentiment of the user or feedback indicating that the determine sentiment is not the true sentiment of the user. The sentiment analysis module 320 may include the new training sample and the ground-truth label of the new training sample into the training set.

The assignment module 340 assigns support requests to agents based on users' sentiments determined by the sentiment analysis module 320. In some embodiments, the assignment module 340 forms a support request queue 360 that includes all pending support requests received by the interface module 310. The support requests in the support request queue 360 may be arranged in an order. The assignment module 340 may determine the order by ranking the pending support requests based on the sentiments of the users making the pending support requests. For instance, the assignment module 340 determines an urgency score for each support request in the in the support request queue 360 based on the sentiment of the user making the support request. The urgency score indicates a level of urgency for servicing the support request. For instance, compared with a support request made by a calm user, a support request made by an anxious user may have a higher urgency score and can be placed before the support request of the calm user in the support request queue 360.

The assignment module 340 may process the support requests in the support request queue 360 based on the order. For instance, the assignment module 340 would process the support request of the anxious user before it process the support request of the calm user, which may cause the calm user to wait longer to get hold of an agent than the anxious user. To process a support report, the assignment module 340 may start with identifying agents that are available to assist the user who made the support report. The assignment module 340 may identify available agents based on agent information stored in the agent datastore 370. The agent information may include identifying information of agents (e.g., name, employee ID, etc.), information of devices associated with agents (e.g., device ID, available functions, etc.), and so on.

The assignment module 340 may determine that an agent is available based on a status of the agent, which indicates that the agent is not servicing any other support requests. The status of the agent may be provided by the agent, e.g., through a device associated with the agent, to the assignment module 340, e.g., through the interface module 310. The status of the agent may be updated by agent or be updated automatically. For instance, the status of the agent can be automatically changed to unavailable after the assignment module 340 assigns a support request to the agent. In embodiments where the assignment module 340 identifies multiple available agents for a support request, the assignment module 340 may select one of the agents to service the support request, e.g., based on historical communications of the agents with the user making the support request, familiarity of the agents with the AVs providing the ride to the user, the types of support sought by the user, and so on. After the assignment module 340 finds an agent to service a support request, the assignment module 340 may send information of the support request to the agent's device. The assignment module 340 may also enable a communication of the agent with the user, e.g., by routing a call from the user to the agent's device.

In embodiments where the assignment module 340 fails to identify any available agent at the time, the assignment module 340 may determine a waiting time for the user based on the user's sentiment and estimated time for an agent to complete another support request. The assignment module 340 may notify the user how long he or she needs to wait to get assistance. The assignment module 340 may instruct the sentiment analysis module 320 to detect any change in the user's sentiment after the user is notified of the waiting time. The assignment module 340 may adjust the waiting time based on the change in the user's sentiment. In an embodiment where the sentiment analysis module 320 determines that the user becomes angrier after he or she receives the notification of the waiting time, the assignment module 340 may reduce the waiting time. For instance, the assignment module 340 may change the order of the support requests in the queue based on the new sentiment of the user and move the user's support request up in the queue.

The guidance module 350 generates guidance for agents' interactions with users based on the user's sentiments determined by the sentiment analysis module 320. After the assignment module 340 assigns an agent to a support report, the guidance module 350 can provide guidance to the agent. The guidance can help the agent to provide effective assistance to the user. The guidance may include a guidance on a communication of the agent with the user than can improve the user's sentiment (e.g., calm down the user, etc.) or make the agent better understand the user's need. For example, the guidance may include guidance on a conversation between the agent and the user, the guidance may specify content of the conversation (such as one or more questions for the user, responses to the user, etc.) or suggested tone of the agent.

In some embodiments, the guidance module 350 may use the guidance store 380 to generate the guidance. For instance, the guidance store 380 may store a look-up table that lists various types of sentiments and include, for each type of sentiment, a guidance for communication with users. The guidance store 380 may identify the guidance associated with the user's sentiment from the look-up table and provide the guidance to the agent. The look-up table may include a set of standard operation procedures. The guidance provided to the agent may be one or more of the standard operation procedures. In other embodiments, the guidance module 350 may use a trained model to generate the guidance. For instance, the guidance module 350 inputs the user's sentiment into the model, and the model outputs the guidance. The model may have been trained by using machine learning techniques, such as those listed above. The trained model is configured to determine guidance for communications of agents with users based on sentiments of users. The trained model may be combined with the sentiment analysis model 330. In an example, the trained model and the sentiment analysis model 330 may be parts of a neural network, which includes a layer outputting user sentiment and another layer outputting guidance.

The guidance may also include a guidance on operation of the AV 110 that provides the ride to the user. The guidance module 350 may modify a state of the AV 110 based on the user's sentiment or other state. The state of the AV 110 may be a temperature, pose (orientation, position, or both), setting of a component of the AV, and so on. The modification of the state of the AV 110 may improve the user's sentiment or make the agent better understand the user's need. In an example, the guidance module 350 may instruct the onboard computer 150 to change the setting of the interior temperature of the AV 110 based on a determination that the user is angry or that the user's body temperature is higher than a threshold. By reducing the temperature inside the AV 110, the user may become calmer. The guidance module 350 may modify the state of the AV 110 by instructing the onboard computer of the AV 110 to make the modification. Additionally or alternatively, the guidance module 350 may instruct the agent to make the modification.

Example Sensor Suite

Figure 4:
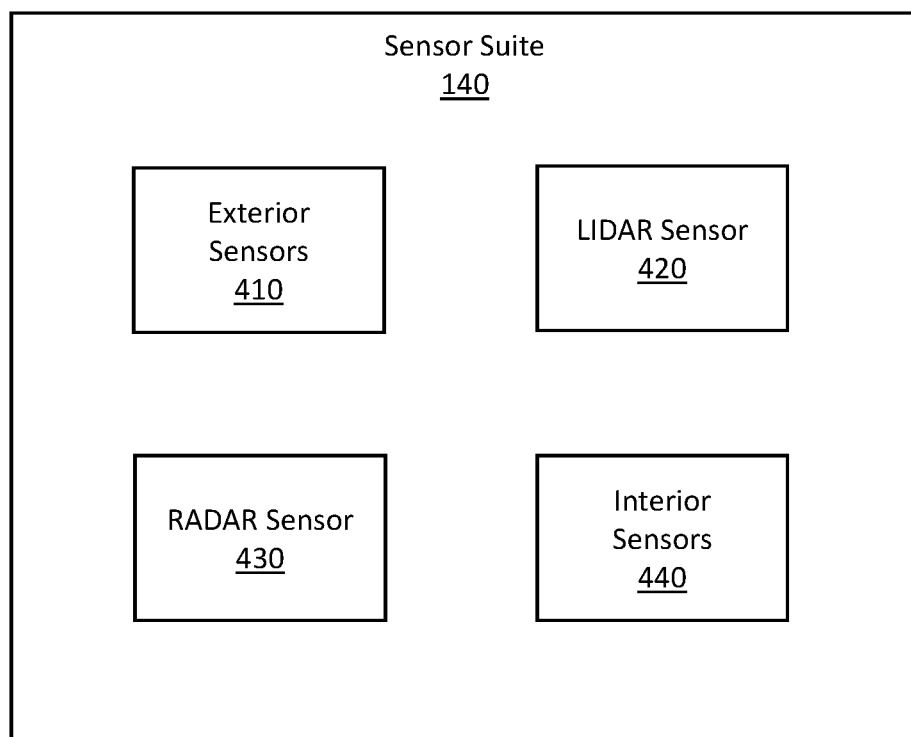
FIG. 4 is a block diagram showing a sensor suite, according to some embodiments of the present disclosure.

FIG. 4 is a block diagram showing the sensor suite 140, according to some embodiments of the present disclosure. The sensor suite 140 includes exterior sensors 410, a LIDAR sensor 420, a RADAR sensor 430, and interior sensors 440. The sensor suite 140 may include any number of the types of sensors shown in FIG. 4, e.g., one or more exterior sensors 410, one or more LIDAR sensors 420, etc. The sensor suite 140 may have more types of sensors than those shown in FIG. 4, such as the sensors described with respect to FIG. 1. In other embodiments, the sensor suite 140 may not include one or more of the sensors shown in FIG. 4.

The exterior sensors 410 detect objects in an environment around the AV 110. The environment may include a scene in which the AV 110 operates. Example objects include persons, buildings, traffic lights, traffic signs, vehicles, street signs, trees, plants, animals, or other types of objects that may be present in the environment around the AV 110. In some embodiments, the exterior sensors 410 include exterior cameras having different views, e.g., a front-facing camera, a back-facing camera, and side-facing cameras. One or more exterior sensors 410 may be implemented using a high-resolution imager with a fixed mounting and field of view. One or more exterior sensors 410 may have adjustable field of views and/or adjustable zooms. In some embodiments, the exterior sensors 410 may operate continually during operation of the AV 110. In an example embodiment, the exterior sensors 410 capture sensor data (e.g., images, etc.) of a scene in which the AV 110 drives. In other embodiment, the exterior sensors 410 may operate in accordance with an instruction from the onboard computer 150 or an external system, such as the user support module 230 of the fleet management system 120. Some of all of the exterior sensors 410 may capture sensor data of one or more objects in an environment surrounding the AV 110 based on the instruction.

The LIDAR sensor 420 measures distances to objects in the vicinity of the AV 110 using reflected laser light. The LIDAR sensor 420 may be a scanning LIDAR that provides a point cloud of the region scanned. The LIDAR sensor 420 may have a fixed field of view or a dynamically configurable field of view. The LIDAR sensor 420 may produce a point cloud that describes, among other things, distances to various objects in the environment of the AV 110.

The RADAR sensor 430 can measure ranges and speeds of objects in the vicinity of the AV 110 using reflected radio waves. The RADAR sensor 430 may be implemented using a scanning RADAR with a fixed field of view or a dynamically configurable field of view. The RADAR sensor 430 may include one or more articulating RADAR sensors, long-range RADAR sensors, short-range RADAR sensors, or some combination thereof.

The interior sensors 440 detect the interior of the AV 110, such as objects inside the AV 110. Example objects inside the AV 110 include users (e.g., passengers), client devices of users, components of the AV 110, items delivered by the AV 110, items facilitating services provided by the AV 110, and so on. The interior sensors 440 may include multiple interior cameras to capture different views, e.g., to capture views of an interior feature, or portions of an interior feature. The interior sensors 440 may be implemented with a fixed mounting and fixed field of view, or the interior sensors 440 may have adjustable field of views and/or adjustable zooms, e.g., to focus on one or more interior features of the AV 110. The interior sensors 440 may transmit sensor data to a perception module (such as the perception module 530 described below in conjunction with FIG. 5), which can use the sensor data to classify a feature and/or to determine a status of a feature.

In some embodiments, some or all of the interior sensors 440 may operate continually during operation of the AV 110. In other embodiment, some or all of the interior sensors 440 may operate in accordance with an instruction from the onboard computer 150 or an external system, such as the user support module 230 of the fleet management system 120. The interior sensors 440 may include a camera that can capture images of passengers. The interior sensors 440 may also include a thermal sensor (e.g., a thermocouple, an infrared sensor, etc.) that can capture a temperature (e.g., body temperature) of the passenger. The interior sensors 440 may further include one or more microphones that can capture sound in the AV 110, such as a conversation made by a passenger.

Example Onboard Computer

Figure 5:
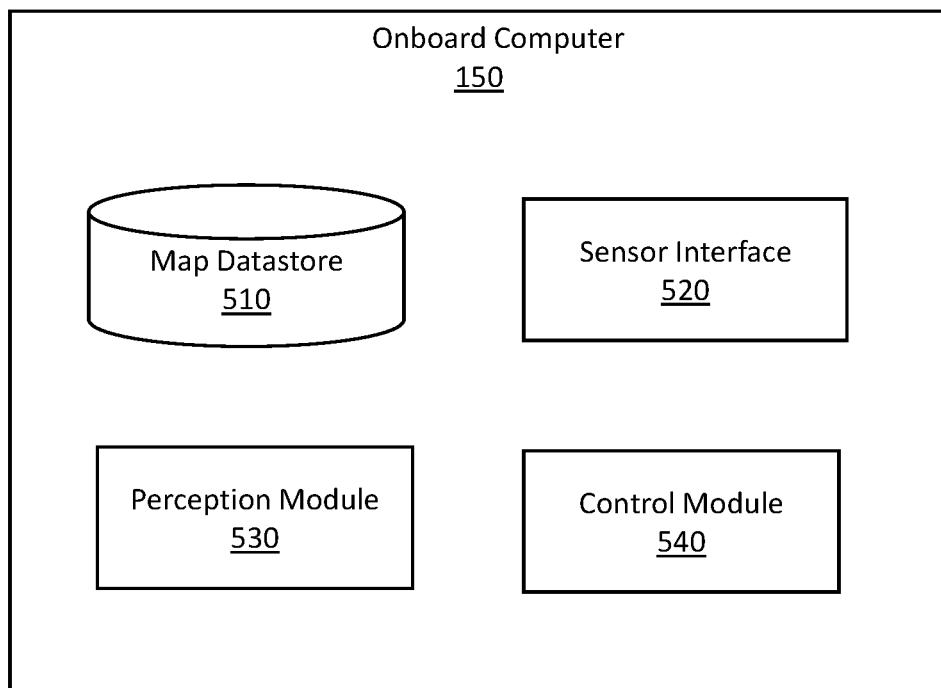
FIG. 5 is a block diagram showing an onboard computer, according to some embodiments of the present disclosure.

FIG. 5 is a block diagram showing the onboard computer 150 of the AV 110 according to some embodiments of the present disclosure. The onboard computer 150 includes map data 510, a sensor interface 520, a perception module 530, and a control module 540. In alternative configurations, fewer, different and/or additional components may be included in the onboard computer 150. For example, components and modules for conducting route planning, controlling movements of the AV 110, and other vehicle functions are not shown in FIG. 5. Further, functionality attributed to one component of the onboard computer 150 may be accomplished by a different component included in the onboard computer 150 or a different system, such as the fleet management system 120.

The map data 510 stores a detailed map that includes a current environment of the AV 110. The map data 510 may include any of the map datastore 250 described in relation to FIG. 5. In some embodiments, the map data 510 stores a subset of the map datastore 250, e.g., map data for a city or region in which the AV 110 is located.

The sensor interface 520 interfaces with the sensors in the sensor suite 140. The sensor interface 520 may request data from the sensor suite 140, e.g., by requesting that a sensor capture data in a particular direction or at a particular time. For example, in response to a request for sensor data from the user support module 230, the sensor interface 520 instructs the sensor suite 140 to capture sensor data of a user in or near the AV 110. In some embodiments, the request may specify one or more conditions of the passenger, the sensor interface 520 may determine which sensors can detect the conditions in the request and instruct the sensor suite 140 to provide data from these sensors. In other embodiments, the request from the user support module 230 may specify which sensor(s) in the sensor suite 140 to provide the sensor data, and the sensor interface 520 may request the sensor(s) to capture data. The request may further provide one or more settings of a sensor, such as orientation, resolution, accuracy, focal length, and so on. The sensor interface 520 can request the sensor to capture data in accordance with the one or more settings. In another example, in response to the perception module 530 or another module determining that a user is in a particular seat in the AV 110 (e.g., based on images from interior sensors 440, a weight sensor, or other sensors), the sensor interface 520 instructs the interior sensors 440 to capture sensor data of the user.

A request for sensor data from the user support module 230 may be a request for real-time sensor data, and the sensor interface 520 can instruct the sensor suite 140 to immediately capture the sensor data and to immediately send the sensor data to the sensor interface 520. The sensor interface 520 is configured to receive data captured by sensors of the sensor suite 140, including data from exterior sensors mounted to the outside of the AV 110, and data from interior sensors mounted in the passenger compartment of the AV 110. The sensor interface 520 may have subcomponents for interfacing with individual sensors or groups of sensors of the sensor suite 140, such as a camera interface, a LIDAR interface, a RADAR interface, a microphone interface, etc. In embodiments where the sensor interface 520 receives a request for sensor data from the user support module 230, the sensor interface 520 may provide sensor data received from the sensor suite 140 to the user support module 230.

The perception module 530 identifies objects and/or other features captured by the sensors of the AV 110. For example, the perception module 530 identifies objects in the environment of the AV 110 and captured by one or more exterior sensors (e.g., the sensors 210-230). The perception module 530 may include one or more classifiers trained using machine learning to identify particular objects. For example, a multi-class classifier may be used to classify each object in the environment of the AV 110 as one of a set of potential objects, e.g., a vehicle, a pedestrian, or a cyclist. As another example, a pedestrian classifier recognizes pedestrians in the environment of the AV 110, a vehicle classifier recognizes vehicles in the environment of the AV 110, etc. The perception module 530 may identify travel speeds of identified objects based on data from the RADAR sensor 430, e.g., speeds at which other vehicles, pedestrians, or birds are traveling. As another example, the perception module 53—may identify distances to identified objects based on data (e.g., a captured point cloud) from the LIDAR sensor 420, e.g., a distance to a particular vehicle, building, or other feature identified by the perception module 530. The perception module 530 may also identify other features or characteristics of objects in the environment of the AV 110 based on image data or other sensor data, e.g., colors (e.g., the colors of Christmas lights), sizes (e.g., heights of people or buildings in the environment), makes and models of vehicles, pictures and/or words on billboards, etc.

The perception module 530 may further process data from captured by interior sensors (e.g., the interior sensors 440 of FIG. 2) to determine information about and/or behaviors of passengers in the AV 110. For example, the perception module 530 may perform facial recognition based on sensor data from the interior sensors 440 to determine which user is seated in which position in the AV 110. As another example, the perception module 530 may process the sensor data to determine passengers' states, such as gestures, activities (e.g., whether passengers are engaged in conversation), moods (whether passengers are bored (e.g., having a blank stare, or looking at their phones)), and so on. The perception module may analyze data from the interior sensors 440, e.g., to determine whether passengers are talking, what passengers are talking about, the mood of the conversation (e.g., cheerful, annoyed, etc.). In some embodiments, the perception module 530 may determine individualized moods, attitudes, or behaviors for the users, e.g., if one user is dominating the conversation while another user is relatively quiet or bored; if one user is cheerful while the other user is getting annoyed; etc. In some embodiments, the perception module 530 may perform voice recognition, e.g., to determine a response to a game prompt spoken by a user.

In some embodiments, the perception module 530 fuses data from one or more interior sensors 440 with data from exterior sensors (e.g., exterior sensors 410) and/or map data 510 to identify environmental objects that one or more users are looking at. The perception module 530 determines, based on an image of a user, a direction in which the user is looking, e.g., a vector extending from the user and out of the AV 110 in a particular direction. The perception module 530 compares this vector to data describing features in the environment of the AV 110, including the features' relative location to the AV 110 (e.g., based on real-time data from exterior sensors and/or the AV's real-time location) to identify a feature in the environment that the user is looking at.

While a single perception module 530 is shown in FIG. 5, in some embodiments, the onboard computer 150 may have multiple perception modules, e.g., different perception modules for performing different ones of the perception tasks described above (e.g., object perception, speed perception, distance perception, feature perception, facial recognition, mood determination, sound analysis, gaze determination, etc.).

The control module 540 controls operations of the AV 110, e.g., based on information from the sensor interface 520 or the perception module 530. In some embodiments, the control module 540 controls operation of the AV 110 by using a trained model, such as a trained neural network. The control module 540 may provide input data to the control model, and the control model outputs operation parameters for the AV 110. The input data may include sensor data from the sensor interface 520 (which may indicate a current state of the AV 110), objects identified by the perception module 530, or both. The operation parameters are parameters indicating operation to be performed by the AV 110. The operation of the AV 110 may include perception, prediction, planning, localization, motion, navigation, other types of operation, or some combination thereof. The control module 540 may provide instructions to various components of the AV 110 based on the output of the control model, and these components of the AV 110 will operation in accordance with the instructions. In an example where the output of the control model indicates that a change of traveling speed of the AV 110 is required given a prediction of traffic condition, the control module 540 may instruct the motor of the AV 110 to change the traveling speed of the AV 110. In another example where the output of the control model indicates a need to detect characteristics of an object in the environment around the AV 110 (e.g., detect a speed limit), the control module 540 may instruct the sensor suite 140 to capture an image of the speed limit sign with sufficient resolution to read the speed limit and instruct the perception module 530 to identify the speed limit in the image.

Example Environment of Providing User Support

Figure 6:
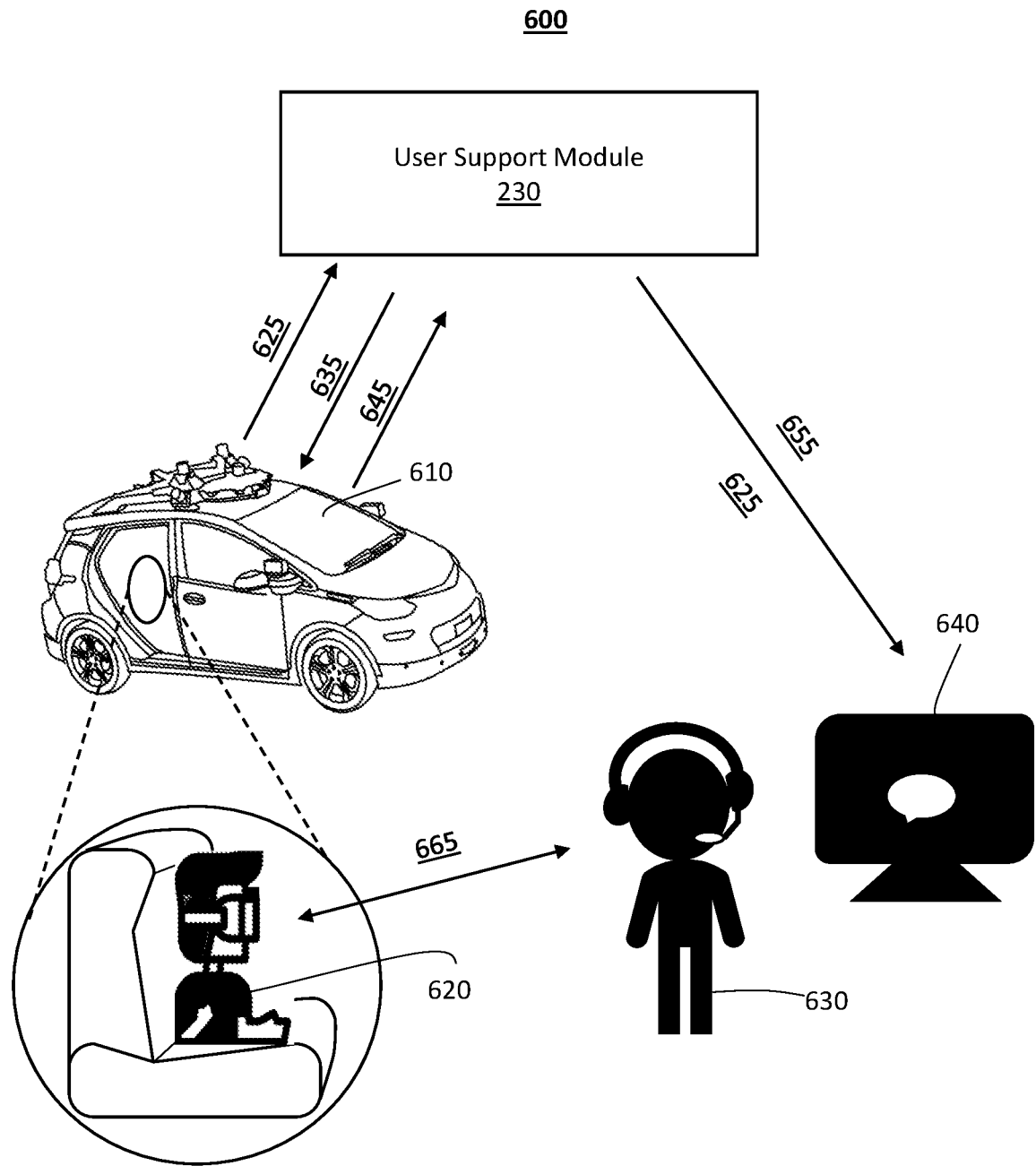
FIG. 6 illustrates an example environment in which support is provided to a user of an AV based on the user's sentiment, according to some embodiments of the present disclosure.

FIG. 6 illustrates an example environment 600 in which support is provided to a user 620 of an AV 610 based on the user's sentiment, according to some embodiments of the present disclosure. The AV 610 is an embodiment of the AV 110 shown in FIG. 1. In the embodiments of FIG. 6, the user 620 sits in the AV 610 and the AV 610 provides a ride to the user 620, and the user 620 is a passenger of the AV 610. In other embodiments, the user 620 may receive other types of services provided by the AV 610, such as item delivery. The user 620 may interact with the AV 610 to load items into the AV 610 or pick up items from the AV 610.

The user 620 is seeking assistance to deal with an issue associated with the operation of the AV 610. In the embodiments of FIG. 6, the user 620 submits a support request 625 to the user support module 230 through the AV 610, e.g., through the onboard computer of the AV 610. In other embodiments, the user 620 may submits the support request 625 through another device, e.g., a client device 130. After receiving the support request 625, the user support module 230 sends a request 635 for sensor data to the AV 610, e.g., the onboard computer. The onboard computer receives the request 635 and instructs the sensor suite to capture the requested data. One or more sensors in the sensor suite can generate sensor data 645 in accordance with the request 635 and provides the sensor data 645 to the onboard computer, which then transmits the sensor data 645 to the user support module 230. The sensor data 645 may be generated based on detection of the user 620, the AV 610, or one or more other objects in the scene surrounding the AV 610. The sensor data 645 includes information that suggests or implies a sentiment of the user 620.

After receiving the sensor data 645, the user support module 230 uses the sensor data 645 to determine a sentiment of the user 620. The user support module 230 may determine the sentiment further based on other data, such as historical data of the user 620, data of the AV 610, and so on. The user support module 230 assigns the support request 625 to an agent 630 based on the sentiment of the user 620. The agent 630 is a person who can help the user 620 to deal with the issue, e.g., through a conversation 665 with the user 620. The user support module 230 further generates a guidance 655 for the conversation 650. The user support module 230 generates the guidance 655 based on the sentiment of the user 620. For instance, the guidance 655 may provide suggestions on how to provide effective assistance to the user 620 or how to improve the sentiment of the user 620. An example of the guidance 655 may include suggested content of the conversation, suggested tone that the agent 630 should use for the conversation, suggested modification of a state of the AV 610, suggested involvement of another agent (e.g., a manager of the agent 630), and so on.

The agent 630 is associated with a device 640, through which the agent 630 can interact with the user support module 230. The device 640 may be managed by the user support module 230. In some embodiments, an application provided by the user support module 230 is executed in the device 640. The application can provide an UI that facilitates interactions between the agent and the user support module 230. For instance, the user support module 230 sends the support request 625 and the guidance 655 to the device 640 and the UI enables the agent 630 to view the support request 625 and the guidance 655. The UI may also enable the agent 630 to update a status of the support request 625. For example, the agent 630 can indicate that he or she fails to resolve the issue for the user 620 and can request another agent 630 to service the support request 625. As another example, the agent 630 can indicate that the support request 625 has been completed.

In some embodiments, the device 640 can also facilitate the conversation 665. The conversation 665 may be conducted based on a communication of the device 640 with the onboard computer of the AV 610. In other embodiments, the conversation 665 can be done through other devices, e.g., a client device 130 of the user 620 or another device associated with the agent 630.

Example Method of Providing Support to AV User

FIG. 7 is a flowchart showing a method 700 of providing support to a user of an AV, according to some embodiments of the present disclosure. The method 700 may be performed by the user support module 230. Although the method 700 is described with reference to the flowchart illustrated in FIG. 7, many other methods of providing support to a user of an AV may alternatively be used. For example, the order of execution of the steps in FIG. 7 may be changed. As another example, some of the steps may be changed, eliminated, or combined.

The user support module 230 receives, in 710, from a first device associated with a user receiving a service from a vehicle, a request for assistance. The vehicle may be an AV, e.g., the AV 110. The service may be a ride service, and the user may be a passenger of the vehicle. The first device may be an onboard computer of the vehicle or a client device (e.g., the client device 130) associated with the user.

The user support module 230 receives, in 720, sensor data from the vehicle. The sensor data is captured by one or more sensors of the vehicle. The one or more sensors may capture the sensor data by detecting the user, the vehicle, or one or more objects in an environment surrounding the user or vehicle. In some embodiments, the user support module 230 sends a request for sensor data to the vehicle in response to receiving the request for assistance. The sensor data is provided by the vehicle in response to the request for sensor data. In some embodiments, the request for sensor data may specify one or more conditions of the user to be detected by a sensor suite of the vehicle. The one or more conditions may be facial expression, pose, gesture, temperature, heart rate, or other types of conditions. The request for sensor data may also specify one or more conditions of the vehicle or another object to be detected. In other embodiments, the request for sensor data may specify which sensor(s) to use to capture the sensor data. The request for sensor data may further specify one or more settings of the sensor(s).

The user support module 230 determines, in 740 a state of a user based on the sensor data. The state may be a sentiment of the user. The sentiment may be negative (e.g., anxious, angry, etc.), neural (e.g., calm), or positive (e.g., confident, happy, etc.). In some embodiments, the user support module 230 inputs the sensor data into a model. The model has been trained to receive sensor data associated with users and to generate outputs indicating states of the users. The user support module 230 determines the state of the user based on an output of the model. In an example, the output of the model comprises a sentiment score indicating a likelihood of the user having a sentiment. The user support module 230 may determine the state of the user further based on other information, such as information associated with a historical request for assistance that was made by the user for a historical service that was provided to the user by the vehicle or another vehicle.

The user support module 230 generates, in 740 based on the state of the user, an instruction for an interaction between the user and an agent to provide the assistance to the user. The instruction may specify content of a conversation between the agent and the user. The user support module 230 may identify the agent from a plurality of agents based on the state of the user. For instance, the user support module 230 may determine availability, experience, or expertise of the plurality of agents.

The user support module 230 provides, in 750 the instruction to a second device associated with the agent. The agent is to make the interaction with the user in accordance with the instruction. In some embodiments, the user support module 230 also determines a waiting time based on the state of the user. The waiting time specifying a duration of time before the assistance is provided to the user. The user support module 230 may instruct the vehicle to change a setting of a component of the vehicle based on the state of the user. For instance, the user support module 230 may instruct the vehicle to change its interior temperature setting to improve the motion of the user based on a determination that the user's sentiment is negative.

Select Examples

Example 1 provides a method, including receiving, from a first device associated with a user receiving a service from a vehicle, a request for assistance; receiving sensor data from the vehicle, the sensor data captured by one or more sensors of the vehicle; determining a state of a user based on the sensor data; generating, based on the state of the user, an instruction for an interaction between the user and an agent to provide the assistance to the user; and providing the instruction to a second device associated with the agent, the agent to make the interaction with the user in accordance with the instruction.

Example 2 provides the method of claim 1, where determining the state of the user based on the sensor data includes inputting the sensor data into a model, the model trained to receive sensor data associated with users and to generate outputs indicating states of the users; and determining the state of the user based on an output of the model.

Example 3 provides the method of claim 2, where the output of the model includes a sentiment score indicating a likelihood of the user having a sentiment.

Example 4 provides the method of claim 1, where the sensor data is generated by the one or more sensors detecting the user, the vehicle, or an object in an environment surrounding the user or vehicle.

Example 5 provides the method of claim 1, where determining the state of the user includes determining the state of the user further based on information associated with a historical request for assistance that was made by the user for a historical service that was provided to the user by the vehicle or another vehicle.

Example 6 provides the method of claim 1, where receiving the sensor data from the vehicle includes in response to receiving the request for assistance, sending a request for sensor data to the vehicle, where the sensor data is provided by the vehicle in response to the request for sensor data.

Example 7 provides the method of claim 1, where the instruction specifies content of a conversation between the agent and the user.

Example 8 provides the method of claim 1, further including determining a waiting time based on the state of the user, the waiting time specifying a duration of time before the assistance is provided to the user.

Example 9 provides the method of claim 1, further including identifying the agent from a plurality of agents based on the state of the user.

Example 10 provides the method of claim 1, further including instructing the vehicle to change a setting of a component of the vehicle based on the state of the user.

Example 11 provides one or more non-transitory computer-readable media storing instructions executable to perform operations, the operations including receiving, from a first device associated with a user receiving a service from a vehicle, a request for assistance; receiving sensor data from the vehicle, the sensor data captured by one or more sensors of the vehicle; determining a state of a user based on the sensor data; generating, based on the state of the user, an instruction for an interaction between the user and an agent to provide the assistance to the user; and providing the instruction to a second device associated with the agent, the agent to make the interaction with the user in accordance with the instruction.

Example 12 provides the one or more non-transitory computer-readable media of claim 11, where determining the state of the user based on the sensor data includes inputting the sensor data into a model, the model trained to receive sensor data associated with users and to generate outputs indicating states of the users; and determining the state of the user based on an output of the model.

Example 13 provides the one or more non-transitory computer-readable media of claim 12, where the output of the model includes a sentiment score indicating a likelihood of the user having a sentiment.

Example 14 provides the one or more non-transitory computer-readable media of claim 11, where the sensor data is generated by the one or more sensors detecting the user, the vehicle, or an object in an environment surrounding the user or vehicle.

Example 15 provides the one or more non-transitory computer-readable media of claim 11, where determining the state of the user includes determining the state of the user further based on information associated with a historical request for assistance that was made by the user for a historical service that was provided to the user by the vehicle or another vehicle.

Example 16 provides the one or more non-transitory computer-readable media of claim 11, where the instruction specifies content of a conversation between the agent and the user.

Example 17 provides the one or more non-transitory computer-readable media of claim 11, where the operations further include instructing the vehicle to change a setting of a component of the vehicle based on the state of the user.

Example 18. A computer system, including a computer processor for executing computer program instructions; and one or more non-transitory computer-readable media storing computer program instructions executable by the computer processor to perform operations including receiving, from a first device associated with a user receiving a service from a vehicle, a request for assistance, receiving sensor data from the vehicle, the sensor data captured by one or more sensors of the vehicle, determining a state of a user based on the sensor data, generating, based on the state of the user, an instruction for an interaction between the user and an agent to provide the assistance to the user, and providing the instruction to a second device associated with the agent, the agent to make the interaction with the user in accordance with the instruction.

Example 19 provides the computer system of claim 18, where determining the state of the user based on the sensor data includes inputting the sensor data into a model, the model trained to receive sensor data associated with users and to generate outputs indicating states of the users; and determining the state of the user based on an output of the model.

Example 20 provides the computer system of claim 18, where the operations further include instructing the vehicle to change a setting of a component of the vehicle based on the state of the user.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method, comprising:
   receiving, from a first device associated with a user receiving a service from an autonomous vehicle, a request for assistance;
   receiving sensor data from the vehicle, the sensor data captured by one or more sensors of the vehicle;
   determining a state of a user based on the sensor data;
   generating, based on the state of the user, an instruction for an interaction between the user and an agent to provide the assistance to the user; and
   providing the instruction to a second device associated with the agent, the agent to make the interaction with the user in accordance with the instruction.

2. The method of claim 1, wherein determining the state of the user based on the sensor data comprises:
   inputting the sensor data into a model, the model trained to receive sensor data associated with users and to generate outputs indicating states of the users; and
   determining the state of the user based on an output of the model.

3. The method of claim 2, wherein the output of the model comprises a sentiment score indicating a likelihood of the user having a sentiment.

4. The method of claim 1, wherein the sensor data is generated by the one or more sensors detecting the user, the vehicle, or an object in an environment surrounding the user or vehicle.

5. The method of claim 1, wherein determining the state of the user comprises:
   determining the state of the user further based on information associated with a historical request for assistance that was made by the user for a historical service that was provided to the user by the vehicle or another vehicle.

6. The method of claim 1, wherein receiving the sensor data from the vehicle comprises:
   in response to receiving the request for assistance, sending a request for sensor data to the vehicle,
   wherein the sensor data is provided by the vehicle in response to the request for sensor data.

7. The method of claim 1, wherein the instruction specifies content of a conversation between the agent and the user.

8. The method of claim 1, further comprising:
   determining a waiting time based on the state of the user, the waiting time specifying a duration of time before the assistance is provided to the user.

9. The method of claim 1, further comprising:
   identifying the agent from a plurality of agents based on the state of the user.

10. The method of claim 1, further comprising:
    instructing the vehicle to change a setting of a component of the vehicle based on the state of the user.

11. One or more non-transitory computer-readable media storing instructions executable to perform operations, the operations comprising:
    receiving, from a first device associated with a user receiving a service from an autonomous vehicle, a request for assistance;

receiving sensor data from the vehicle, the sensor data captured by one or more sensors of the vehicle;

determining a state of a user based on the sensor data;

generating, based on the state of the user, an instruction for an interaction between the user and an agent to provide the assistance to the user; and providing the instruction to a second device associated with the agent, the agent to make the interaction with the user in accordance with the instruction.

12. The one or more non-transitory computer-readable media of claim 11, wherein determining the state of the user based on the sensor data comprises:

inputting the sensor data into a model, the model trained to receive sensor data associated with users and to generate outputs indicating states of the users; and determining the state of the user based on an output of the model.

13. The one or more non-transitory computer-readable media of claim 12, wherein the output of the model comprises a sentiment score indicating a likelihood of the user having a sentiment.

14. The one or more non-transitory computer-readable media of claim 11, wherein the sensor data is generated by the one or more sensors detecting the user, the vehicle, or an object in an environment surrounding the user or vehicle.

15. The one or more non-transitory computer-readable media of claim 11, wherein determining the state of the user comprises:

determining the state of the user further based on information associated with a historical request for assistance that was made by the user for a historical service that was provided to the user by the vehicle or another vehicle.

16. The one or more non-transitory computer-readable media of claim 11, wherein the instruction specifies content of a conversation between the agent and the user.

17. The one or more non-transitory computer-readable media of claim 11, wherein the operations further comprise:

instructing the vehicle to change a setting of a component of the vehicle based on the state of the user.

18. A computer system, comprising:

a computer processor for executing computer program instructions; and one or more non-transitory computer-readable media storing computer program instructions executable by the computer processor to perform operations comprising:

receiving, from a first device associated with a user receiving a service from an autonomous vehicle, a request for assistance receiving sensor data from the vehicle, the sensor data captured by one or more sensors of the vehicle determining a state of a user based on the sensor data generating, based on the state of the user, an instruction for an interaction between the user and an agent to provide the assistance to the user and providing the instruction to a second device associated with the agent, the agent to make the interaction with the user in accordance with the instruction.

19. The computer system of claim 18, wherein determining the state of the user based on the sensor data comprises:

inputting the sensor data into a model, the model trained to receive sensor data associated with users and to generate outputs indicating states of the users; and determining the state of the user based on an output of the model.

20. The computer system of claim 18, wherein the operations further comprise:

instructing the vehicle to change a setting of a component of the vehicle based on the state of the user.

* * * * *